United States Patent [19]

Ueda

[11] Patent Number: 4,831,823
[45] Date of Patent: May 23, 1989

[54] EXHAUST GAS CONTROL MEANS FOR MOTORCYCLE AND THE LIKE

[75] Inventor: Hideaki Ueda, Iwata, Japan

[73] Assignee: Yamada Hatsudoki Kabushiki Kaisha, Iwata, Japan

[21] Appl. No.: 159,170

[22] Filed: Feb. 23, 1988

[30] Foreign Application Priority Data

Feb. 24, 1987 [JP] Japan ................................. 62-39257
Feb. 24, 1987 [JP] Japan ................................. 62-39258

[51] Int. Cl.$^4$ ............................................ F02B 27/02
[52] U.S. Cl. ........................................................ 60/313
[58] Field of Search ................................. 60/312, 313

[56] References Cited

U.S. PATENT DOCUMENTS

| | | |
|---|---|---|
| 933,906 | 9/1909 | Illy . |
| 1,411,226 | 3/1922 | Stumpf . |
| 2,230,740 | 10/1939 | Birkigt . |
| 2,239,262 | 4/1941 | Violet . |
| 2,305,946 | 12/1942 | Wilson . |
| 2,627,851 | 2/1953 | Cushman . |
| 2,644,436 | 10/1950 | Berlyn . |
| 2,686,398 | 10/1952 | Anderson . |
| 2,717,583 | 9/1955 | Maybach . |
| 3,751,921 | 8/1973 | Blomberg . |
| 3,817,227 | 6/1974 | Onishi . |
| 3,938,330 | 2/1976 | Nakajima . |
| 3,969,895 | 6/1976 | Krizman . |
| 4,051,821 | 10/1987 | Amann . |
| 4,254,752 | 3/1981 | Friddell . |
| 4,522,029 | 6/1985 | Tomita . |
| 4,539,813 | 9/1985 | Tomita . |
| 4,545,200 | 10/1985 | Oike . |
| 4,554,785 | 11/1985 | Oike . |
| 4,558,566 | 12/1985 | Shirakura . |

FOREIGN PATENT DOCUMENTS

| | | | |
|---|---|---|---|
| 2567194 | 1/1986 | France ................................. | 60/313 |
| 102508 | 6/1982 | Japan ................................. | 60/312 |
| 212622 | 9/1986 | Japan ................................. | 60/313 |

*Primary Examiner*—Douglas Hart
*Attorney, Agent, or Firm*—Ernest A. Beutler

[57] ABSTRACT

An exhaust gas control means for motorcycles or the like wherein an expansion chamber that contains an exhaust control valve is positioned beneath and to the rear of the engine. The individual exhaust pipes extend from the exhaust ports of the engine into the expansion chamber in proximity to the valve for improving the performance throughout the engine speed and load ranges.

25 Claims, 5 Drawing Sheets

EXHAUST GAS CONTROL MEANS FOR MOTORCYCLE AND THE LIKE

BACKGROUND OF THE INVENTION

This invention relates to an exhaust gas control means for a motorcycle and the like and more particularly to an improved arrangement for controlling the exhaust gases of an internal combustion engine and for arranging the exhaust components in a motorcycle.

It is well known that the tuning of an exhaust system for an internal combustion engine is particularly important in determining the performance of the engine. It has been found that the performance of the engine can be improved significantly if the exhaust pipe which conveys the exhaust gases from the engine exhaust port terminates within an expansion chamber. Although such an arrangement can increase the output of an engine at high speeds, such combined exhaust pipe and expansion chamber systems can offer certain disadvantage under other running conditions. This is particularly true when multiple exhaust pipes from different cylinders discharge into the same expansion chamber.

It has been found that resonant pulses will occur in the exhaust pipes which may be transmitted from one exhaust pipe back into another which can adversely affect the performance at mid-range. In order to obviate these difficulties, it has been proposed to provide a reflective control valve at the termination of the exhaust pipe which control valve is positioned in response to engine running characteristics. The exhaust control valve can create reflective pulses that will overcome the deleterious effects aforenoted. The copending applications "High Performance Exhaust System For Internal Combustion Engine", Ser. Nos. 935,340 and 934,342, filed Nov. 26, 1986 in the name of Hideaki Ueda and assigned to the assignee of this application, disclose arrangements wherein this principle is disclosed and the disclosure of these applications is incorporated herein by reference.

Although the arrangements disclosed in the aforenoted copending applications will overcome the performance difficulties discussed above, further improvement is possible. Specifically, the arrangements shown in the aforenoted copending applications position the control valves at the point where the exhaust pipes enter the expansion chamber. Although such an arrangement has utility in connection with certain engines and applications, the tuning of the lenght of the exhaust pipe and its relationship to the expansion chamber can be particularly important. In some instance, it is desirable to have the exhaust pipe extend into the expansion chamber and terminate within the expansion chamber.

Furthermore, with many types of compact vehicles such as motorcycles and the like, the actual placement of the valve in relation to the engine, bearing in mind that the exhaust system passes beneath the engine and ground clearance is extremely critical, can make arrangements of the type shown in the aforenoted copending applications less than fully satisfactory.

It is, therefore, a principal object of this invention to provide an improved exhaust control system for an internal combustion engine.

It is a further object of this invention to provide an improved exhaust gas control arrangement that is particularly adapted for exhaust gas tuning and which can be applied to compact vehicles such as motorcycles.

It is yet another object of this invention to provide an improved exhaust gas control arrangement for motorcycles.

In connection with the use of control valves in engine exhaust systems, the heat of the exhaust gases can have serious effects on the operation of the control valve. That is, the substantial temperature differences that can exist in an exhaust system from start up to normal running temperatures can be significant and the operation of the control valve could be adversely affected by such an arrangement.

It is, therefore, a still further object of this invention to provide an improved exhaust gas control arrangement for internal combustion engines wherein the exhaust control valve is maintained at a more uniform temperature.

SUMMARY OF THE INVENTION

A first feature of this invention is adapted to be embodied in an internal combustion engine that has a combustion chamber, an exhaust port for discharging exhaust gases from the combustion chamber and an exhaust pipe that extends from the exhaust port for conveying the exhaust gases from the exhaust port. An expansion chamber is incorporated into which the exhaust pipe discharges. In accordance with this feature of the invention, the exhaust pipe extends into the expansion chamber and has its ends spaced from the side walls of the expansion chamber. Reflective means are adjustably positioned contiguous to the end of the exhaust pipe for providing a variable reflective area upon which acoustical waves in the exhaust gases in the exhaust pipe will reflect for reducing the pressure at the exhaust port and selectively operable means are providing for adjusting the reflective means effective area in response to an engine condition.

Another feature of the invention is adapted to be embodied in a motorcycle having an internal combustion engine that has an exhaust port and an exhaust pipe that convey gases from the exhaust port downwardly and beneath the engine. In accordance with this feature of the invention, the exhaust pipe enters into an expansion chamber that is positioned beneath and to the rear of the engine and a reflective valve arrangement is contained within this expansion chamber.

DETAILED DESCRIPTION OF THE PREFERRED EMBODIMENTS

Figure 1:
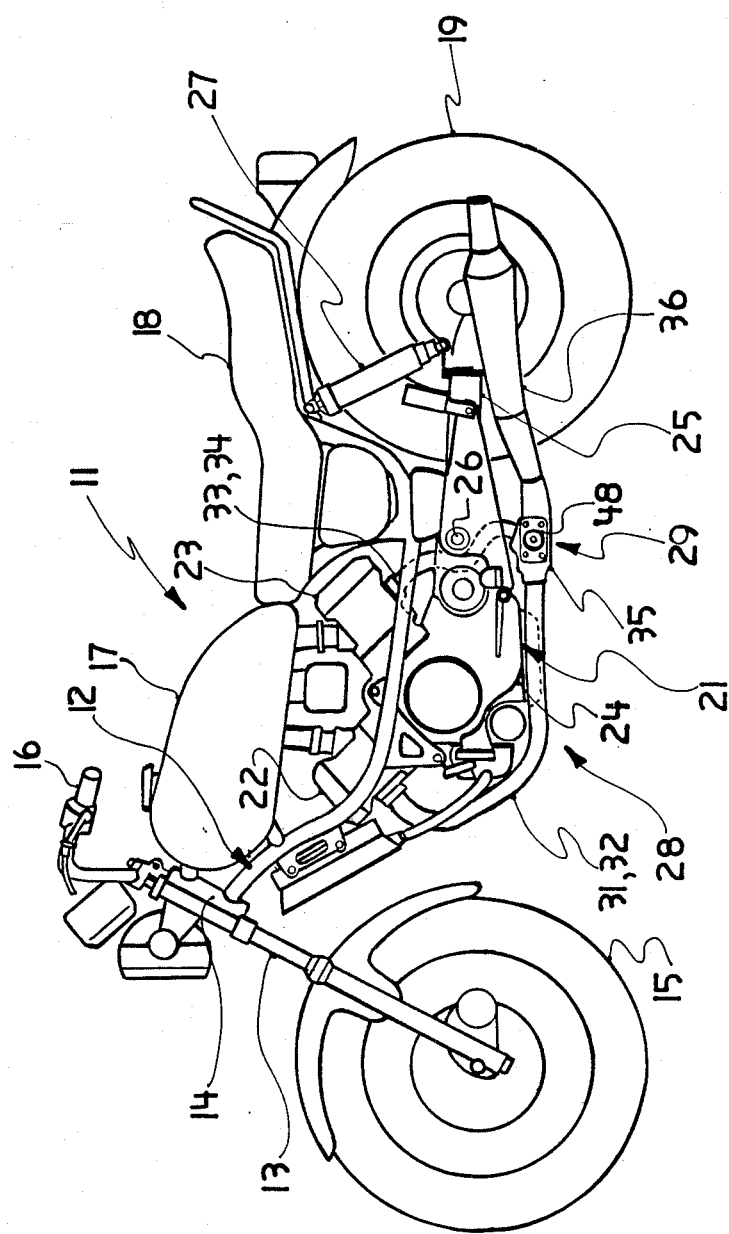
FIG. 1 is a side elevational view of a motorcycle having an exhaust system and exhaust control arrangement constructed in accordance with an embodiment of the invention.

Referring first to FIG. 1, a motorcycle is indicated generally at 11. The motorcycle 11 is depicted as a typical environment in which the invention may be practiced, although it is to be understood that certain facets of the invention may have application with other types of vehicles or with other applications for internal combustion engines.

The motorcycle 11, may generally have a conventional configuration, and is depicted as being comprised of a frame assembly 12 that mounts a front fork assembly 13 for steering movement relative to a head pipe 14. A front wheel 15 is suspended by the front fork assembly 13 in a known manner and is steered by a handlebar arrangement 16.

A fuel tank 17 is carried on the frame assembly 12 rearwardly of the handlebar 16 and a seat 18 is supported to the rear of the fuel tank 17 for accommodating a rider. A driven rear wheel 19 is positioned beneath the seat and is driven by a power unit, indicated generally by the reference numeral 21. In the illustrated embodiment, the power unit 21 is comprised of a V4, four-cycle, internal combustion engine having a forwardly disposed cylinder bank 22 and a rearwardly disposed cylinder bank 23. The cylinder banks 22 and 23 each have pairs of cylinders. A combined crankcase, transmission assembly 24 is positioned beneath the cylinder banks 22 and 23 and contains the output shaft of the engine which rotates about a generally transversely extending axis. This shaft drives a change speed transmission of a known type. The change speed transmission drives the rear wheel 19 in any suitable manner.

The rear wheel 19 is suspended for suspension movement relative to the frame assembly 12 by means including a trailing arm 25 that is pivoted about a pivot point 26. A combined shock absorber, spring assembly 27 cushions the movement of the rear wheel 19 relative to the frame 12.

As has been noted, the construction of the motorcycle as thus far described may be considered to be conventional and typical of the environment in which the invention may be practiced. The invention resides in the construction of the exhaust system for the engine and this exhaust system is indicated generally by the reference numeral 28 and incorporates an exhaust gas control arrangement, indicated generally by the reference numeral 29.

Figure 2:
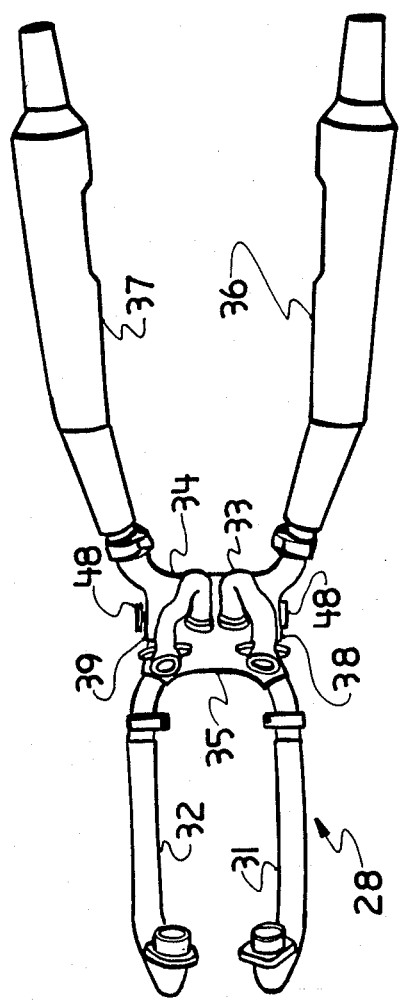
FIG. 2 is an enlarged top plan view of the exhaust system and exhaust control arrangement.
Figure 3:
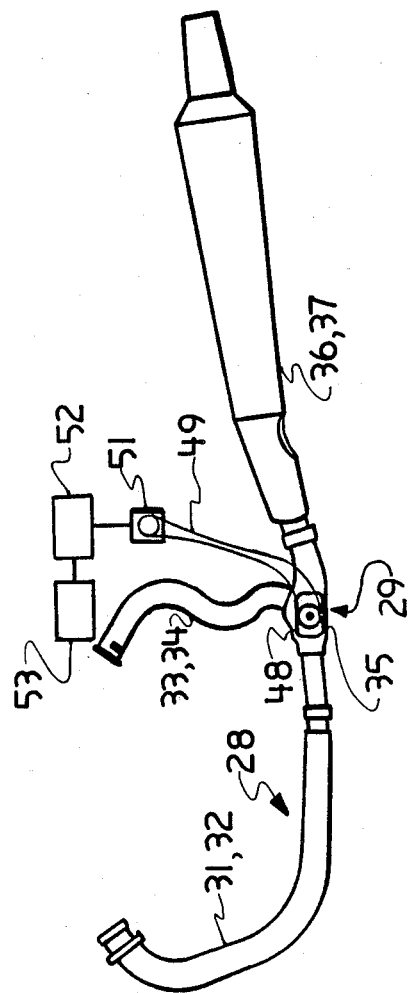
FIG. 3 is a side elevational view of the exhaust system and exhaust control.

Referring now primarily to FIGS. 2 and 3, the exhaust system 28 is depicted in more detail. It should be noted that the cylinder banks 22 and 23 define forward and rearwardly facing exhaust ports (not shown) that also are inclined so as to face downwardly. A first pair of exhaust pipes 31 and 32 extend from the exhaust ports of the cylinder bank 22 first forwardly and downwardly and then curve rearwardly under the crankcase, transmission assembly 24. A recess may be formed in the underside of the crankcase, transmission assembly 24 so as to clear the trailing portion of the exhaust pipes 31 and 32 so as to improve ground clearance.

A second pair of exhaust pipes 33 and 34 extend from the exhaust ports of the rear cylinder bank 23 in a generally downward direction. The exhaust pipes 33 and 34 have their inlet ends in communication with the exhaust ports of the cylinder bank 23 for receiving the exhaust gases discharged from the combustion chambers of this cylinder bank.

The exhaust pipes 31, 32, 33 and 34 all merge into a common expansion chamber 35 that is positioned rearwardly of the crankcase, transmission assembly 24 and generally beneath it. The expansion chamber 35 extends transversely across the width of the motorcycle 11 and thus can have significant volume so as to achieve the desired exhaust gas tuning.

Figure 4:
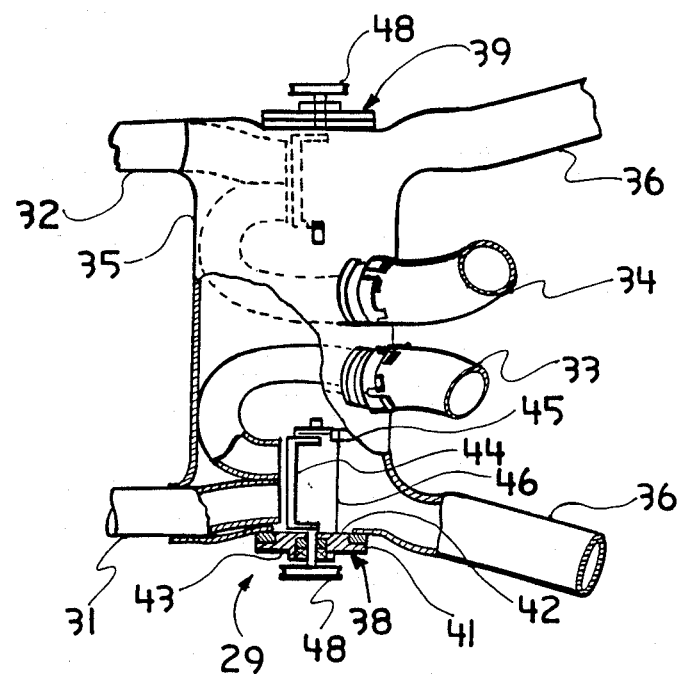
FIG. 4 is a further enlarged top plan view, with a portion broken away, showing the portion of the exhaust system that incorporates the exhaust control.
Figure 5:
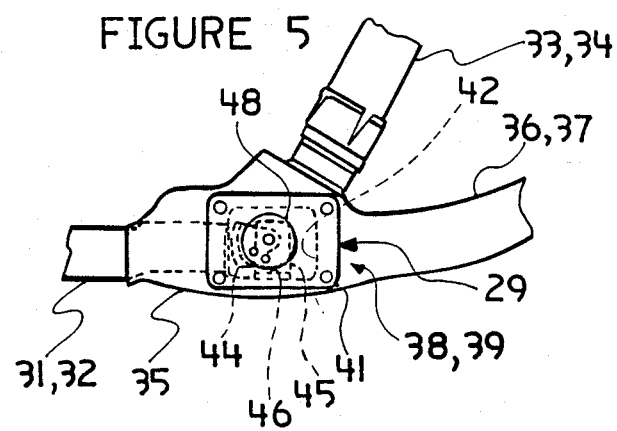
FIG. 5 is a side elevational view of the portion of the construction shown in FIG. 4.
Figure 6:
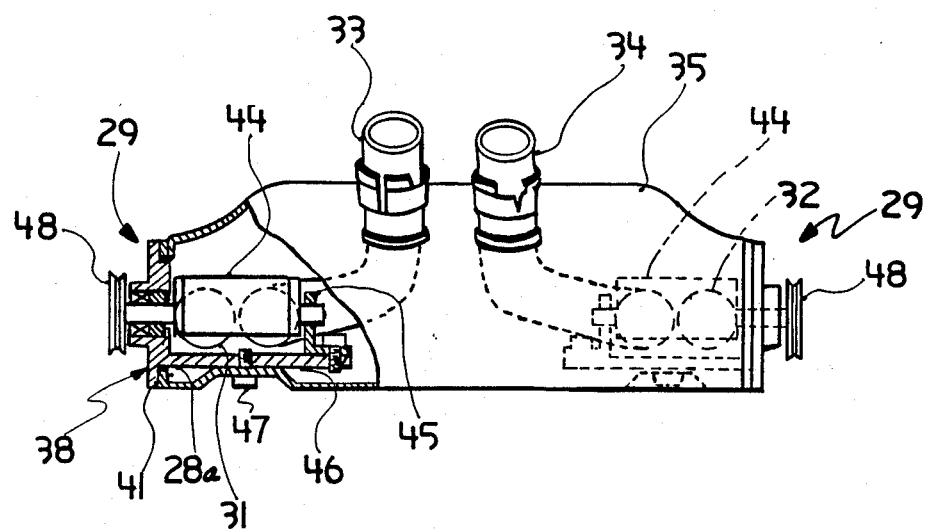
FIG. 6 is a rear elevational view, with a portion broken away.

Referring now primarily to FIGS. 4 and 5, it will be seen that the exhaust pipes 31 and 32 extend into the expansion chamber 35 and terminate between its forward and rear side walls. As a result, it is possible to lenghten the exhaust pipes 31 and 32 so as to provide the desired tuning. In a like manner, the exhaust pipes 33 and 34, which enter the expansion chamber 35 through its upper wall, have a re-entrant curved position with the pipes 33 and 34 also terminating in the longitudinal mid-section of the expansion chamber 35. The curved re-entrant portion of the exhaust pipes 33 and 34 permits these pipes to be lengthened so that they are substantially the same lenght as the pipes 31 and 32 and also causes the exhaust pipes 31 and 33 and 32 and 34 to terminate adjacent each other so as to form pairs for a reason to be described.

The exhaust gases which are delivered from the exhaust pipes 31, 32, 33 and 34 to the expansion chamber 35 are discharged to the atmosphere through a pair of tailpipe, muffler assemblies 36 and 37, which exit from the expansion chamber 35 and its rearward sides thereof. The tailpipe, mufflers 36 and 37 lie on opposite sides of the rear wheel 19.

The combination of the exhaust pipes 31, 32, 33 and 34 and expansion chamber 35 are tuned so as to permit a high power output. As has been noted, however the fact that the cylinders of the engine fire at different intervals, may cause pulsations in the expansion chamber 35 that are transmitted back through the exhaust pipes to the other cylinder ports which can adversely affect performance under certain running conditions. The valve assembly 29 is provided so as to preclude such deterioration in low and mid-range performance.

The valve assembly 29 actually comprises a pair of valves 38 and 39 which respectively cooperate with the exhaust pipe pairs 31, 33 and 32, 34 so as to prevent this condition. Each valve assembly 38 and 39 is the same but they are positioned, as aforenoted, on opposite sides of the expansion chamber. Each valve assembly 38 and 39 includes a cover plate 41 that is inserted into an opening 42 formed in a side of the expansion chamber 35. A shaft 43 is journaled in the cover plate 41 and carries one end of an eccentric valve member 44. The opposite end of the valve member 44 is contained internally in the expansion chamber 35 and is journaled by a bearing plate 45. The bearing plate 45 is affixed to the cover plate 41 by means of a mounting bracket 46 which is secured in position to the outer housing of the expansion chamber 35 by means of a fastener 47. A pulley 48 is affixed to the exposed end of the shafts 43 for positioning the valve members 44.

The mechanism which positions the valve members 44 is shown schematically in FIG. 3 and is comprised of a pair of wire transmitters 49 that are connected to the pulley 48 and to a drive motor 51. The drive motor 51 is controlled by a computer 52 in accordance with a map or program that is relative to an engine running characteristic such as engine speed as determined by a speed sensor 53. The method of controlling the position of the valves 44 is as described in the aforenoted copending applications and the disclosure therein is incorporated herein by reference.

In connection with this construction, the positioning of the control valve elements 44 internally of the expansion chamber 35 permits a compact configuration and the lengthening of the exhaust pipes 31, 32, 33 and 34 permits appropriate tuning in a relatively short overall lenght. Furthermore, since the valves 44 are positioned internally in the expansion chamber 38, they will be subject to less heat variations than externally positioned control valves. As a result, smoother operation can be achieved.

Figure 7:
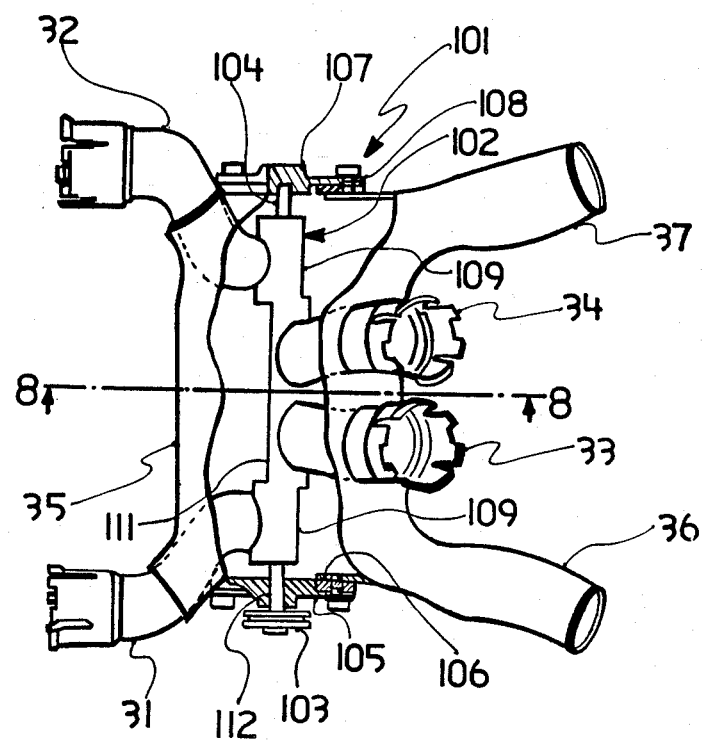
FIG. 7 is a top plan view, with a portion broken away, in part similar to FIG. 4, showing another embodiment of the invention.
Figure 8:
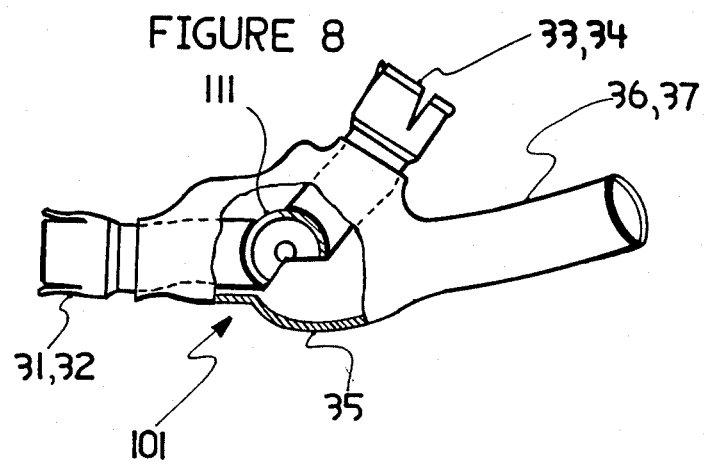
FIG. 8 is a cross-sectional view taken along the line 8—8 of FIG. 7.

In this embodiment, there are provided the two control valves 38 and 39, however, they are operated in unison by a common control motor 51. In some instances, it may be possible to support all of the control valve elements on a single shaft and FIGS. 7 and 8 show such an embodiment. Except for this difference, the embodiment of FIGS. 7 and 8 is the same as that of the embodiments thus far described and, therefore, components of this embodiment which are the same as the previously described embodiment have been identified by the same reference numerals and will not be described again, except insofar as is necessary to understand the construction and operation of this embodiment.

In this embodiment, a control valve, indicated generally by the reference numeral 101 is positioned centrally of the expansion chamber 35. The control valve 101 includes a valve element 102 having a pair of stub shafts 103 and 104 extending from its opposite ends. The stub shaft 103 is journaled in a cover plate 105 that extends across an opening 106 in the expansion chamber 35. The stub shaft 104 is supported in a cover plate 107 that is positioned in an opening 108 formed in the opposite side of the expansion chamber 35.

The valve member 102 has a plurality of arcuate sections comprising a first pair 109 which first pair cooperates with the ends of the exhaust pipes 31 and 32 for controlling their reflective area. A second pair which actually is comprised of a singular continuous surface 111 cooperates with the ends of the exhaust pipes 33 and 34 for controlling their reflective areas. As with the previously described embodiment, rotation of the valve member 102 is accomplished by means of a pair of flexible transmitters that act on a pulley 112 affixed to the end of the stub shaft 103 in accordance with the program as aforedescribed.

It should be readily apparent from the foregoing description that several embodiments of the invention have been illustrated and described, each of which permits the tuning of the lenght of the exhaust pipes relative to the expansion chamber in the small confines of a motorcycle and also the provision of control valves in this same small area within the expansion chamber. This internal positioning of the control valves is effective to minimize temperature variations in the control valve mechanism and problems attendant therewith. Although two embodiments of the invention have been illustrated and described, various other changes and modifications may be made without departing from the spirit and scope of the invention as defined by the appended claims.

What is claimed is:

1. In an internal combustion engine having a combuston chamber, an exhaust port for discharging exhaust gases from said combustion chamber, an exhaust pipe extending from said exhaust port for conveying exhaust gases therefrom, and an expansion chamber into which said exhaust pipe discharges, the improvement comprising said exhaust pipe extending into said expansion chamber and having its end spaced from the side walls of said expansion chamber, reflective means adjustably positioned contiguous to said end of said exhaust pipe for providing a variable reflective area upon which acoustic waves in the exhaust gases in said exhaust pipe will reflect for reducing the pressure at said exhaust port, and selectively operable means for adjusting said reflective means effective area in response to an engine condition.

2. In an internal combustion engine as set forth in claim 1 wherein the engine has a pair of combustion chambers, a pair of exhaust ports and an exhaust pipe extending from each of the exhaust ports into the expansion chamber and having their ends spaced from the side walls of the expansion chamber.

3. In an internal combustion engine as set forth in claim 2 wherein the exhaust pipe ends are positioned adjacent to each other.

4. In an internal combustion engine as set forth in claim 3 wherein the reflective means comprises a valve element supported upon a shaft.

5. In an internal combustion engine as set forth in claim 2 wherein there are four combustion chambers, exhaust ports and exhaust pipes.

6. In an internal combustion engine as set forth in claim 5 wherein the exhaust pipe ends are arranged in pairs.

7. In an internal combustion engine as set forth in claim 6 wherein a reflective member cooperates with the ends of all of the exhaust pipes.

8. In an internal combuston engine as set forth in claim 6 wherein there are a pair of reflective means each cooperating with a respective one of the exhaust pipe pairs.

9. In an internal combustion engine as set forth in claim 1 wherein the reflective means comprises a valve rotatably journaled within the expansion chamber.

10. In an internal combustion engine as set forth in claim 1 in combination with a motorcycle wherein the expansion chamber is positioned beneath and to the rear of the engine.

11. In an internal combustion engine as set forth in claim 10 wherein the engine has a pair of combustion chambers, a pair of exhaust ports and an exhaust pipe extending from each of the exhaust ports into the expansion chamber and having their ends spaced from the side walls of the expansion chamber.

12. In an internal combustion engine as set forth in claim 11 wherein the exhaust pipe ends are positioned adjacent to each other.

13. In an internal combustion engine as set forth in claim 12 wherein the reflective means comprises a valve element supported upon a shaft.

14. In an internal combustion engine as set forth in claim 11 wherein there are four combustion chambers, exhaust ports and exhaust pipes.

15. In an internal combustion engine as set forth in claim 14 wherein the exhaust pipe ends are arranged in pairs.

16. In an internal combustion engine as set forth in claim 13 wherein a reflective member cooperates with the ends of all of the exhaust pipes.

17. In an internal combuston engine as set forth in claim 15 wherein there are a pair of reflective means each cooperating with a respective one of the exhaust pipe pairs.

18. A motorcycle having an internal combustion engine, an exhaust port, an exhaust pipe communicating with said exhaust port for conveying exhaust gases from said exhaust port downwardly and rearwardly beneath said engine, an expansion chamber positioned beneath and to the rear of said engine, said exhaust pipe entering into said expansion chamber, and having an end and a reflective valve arrangement having a reflective surface supported within said expansion chamber for communicating with said exhaust pipe for providing a variable effective reflective area across the end of said exhaust pipe.

19. A motorcycle as set forth in claim 18 wherein the engine has a pair of combustion chambers, a pair of exhaust ports and an exhaust pipe extending from each of the exhaust ports into the expansion chamber and having their ends spaced from the side walls of the expansion chamber.

20. A motorcycle as set forth in claim 19 wherein the exhaust pipe ends are positioned adjacent to each other.

21. A motorcycle as set forth in claim 20 wherein the reflective means comprises a valve element supported upon a shaft.

22. A motorcycle as set forth in claim 19 wherein there are four combustion chambers, exhaust ports and exhaust pipes.

23. A motorcycle as set forth in claim 22 wherein the exhaust pipe ends are arranged in pairs.

24. A motorcycle as set forth in claim 23 wherein a reflective member cooperates with the ends of all of the exhaust pipes.

25. A motorcycle as set forth in claim 23 wherein there are a pair of reflective means each cooperating with a respective one of the exhaust pipe pairs.

* * * * *